US008938410B2

(12) United States Patent
Cafarella et al.

(10) Patent No.: US 8,938,410 B2
(45) Date of Patent: Jan. 20, 2015

(54) OPEN INFORMATION EXTRACTION FROM THE WEB

(75) Inventors: Michael J. Cafarella, Seattle, WA (US); Michele Banko, Seattle, WA (US); Oren Etzioni, Seattle, WA (US)

(73) Assignee: University of Washington through its Center for Commercialization, Seattle, WA (US)

( * ) Notice: Subject to any disclaimer, the term of this patent is extended or adjusted under 35 U.S.C. 154(b) by 121 days.

(21) Appl. No.: 12/970,155

(22) Filed: Dec. 16, 2010

(65) Prior Publication Data

US 2011/0191276 A1    Aug. 4, 2011

Related U.S. Application Data

(63) Continuation of application No. 11/695,506, filed on Apr. 2, 2007, now Pat. No. 7,877,343.

(51) Int. Cl.
| | |
|---|---|
| *G06N 5/00* | (2006.01) |
| *G06F 1/00* | (2006.01) |
| *G06F 17/30* | (2006.01) |
| *G06Q 10/02* | (2012.01) |

(52) U.S. Cl.
CPC .... *G06F 17/30696* (2013.01); *G06F 17/30713* (2013.01); *G06F 17/30716* (2013.01); *G06Q 10/02* (2013.01)
USPC .................... 706/20; 707/742; 704/9; 704/10

(58) Field of Classification Search
USPC ......................................................... 706/20
See application file for complete search history.

(56) References Cited

U.S. PATENT DOCUMENTS

| | | | |
|---|---|---|---|
| 7,499,892 B2 | 3/2009 | Aoyama et al. | |
| 2003/0061201 A1 | 3/2003 | Grefenstette et al. | |
| 2004/0044952 A1* | 3/2004 | Jiang et al. ..................... | 715/500 |
| 2005/0262050 A1 | 11/2005 | Fagin et al. | |
| 2005/0278362 A1 | 12/2005 | Maren et al. | |

(Continued)

OTHER PUBLICATIONS

Du, Siqing and Metzler, Douglas P., "An Automated Multi-component Approach to Extracting Entity Relationships from Database Requirement Specification Documents," ISSN 0302-9743, pp. 1-11, Jul. 4, 2006.

(Continued)

*Primary Examiner* — Jeffrey Gaffin
*Assistant Examiner* — Kalpana Bharadwaj
(74) *Attorney, Agent, or Firm* — Perkins Coie LLP

(57) ABSTRACT

To implement open information extraction, a new extraction paradigm has been developed in which a system makes a single data-driven pass over a corpus of text, extracting a large set of relational tuples without requiring any human input. Using training data, a Self-Supervised Learner employs a parser and heuristics to determine criteria that will be used by an extraction classifier (or other ranking model) for evaluating the trustworthiness of candidate tuples that have been extracted from the corpus of text, by applying heuristics to the corpus of text. The classifier retains tuples with a sufficiently high probability of being trustworthy. A redundancy-based assessor assigns a probability to each retained tuple to indicate a likelihood that the retained tuple is an actual instance of a relationship between a plurality of objects comprising the retained tuple. The retained tuples comprise an extraction graph that can be queried for information.

25 Claims, 7 Drawing Sheets

(56) References Cited

U.S. PATENT DOCUMENTS

2006/0184473 A1    8/2006  Eder
2007/0124291 A1*   5/2007  Hassan et al. ............... 707/3
2007/0244881 A1*  10/2007  Cha et al. .................. 707/5

OTHER PUBLICATIONS

Lin, Dekang and Pantel, Patrick, "DIRT—Discovery of Inference Rules from Text," University of Alberta, Department of Computing Science, Edmonton, Alberta T6H 2E 1 Canada, 6 pages.

* cited by examiner

OPEN INFORMATION EXTRACTION FROM THE WEB

CROSS-REFERENCE TO RELATED APPLICATION(S)

This utility patent application is a Continuation of U.S. patent application Ser. No. 11/695,506 entitled "Open Information Extraction From The Web," filed on Apr. 2, 2007, the benefit of which is claimed under 35 U.S.C. §120, and which is incorporated herein by reference in its entirety.

GOVERNMENT RIGHTS

This invention was made with government support under grants IIS-0312988 and IIS-0535284 awarded by the National Science Foundation (NSF), grant N00014-05-1-0185 awarded by the Office of Naval Research (ONR), and contract NBCHD03001 awarded by the Defense Advanced Research Projects Agency (DARPA). The government has certain rights in the invention.

BACKGROUND

Traditionally, Information Extraction (IE) has focused on satisfying precise, narrow, pre-specified requests from small homogeneous corpora (e.g., extract the location and time of seminars from a set of announcements). Shifting to a new domain requires the user to name the target relations and to manually create new extraction rules or hand-tag new training examples. This manual labor scales linearly with the number of target relations. Thus, IE has traditionally relied on extensive human involvement in the form of hand-crafted extraction rules or hand-tagged training examples. Moreover, the user is required to explicitly pre-specify each relation of interest. While IE has become increasingly automated over time, enumerating all potential relations of interest for extraction by an IE system is highly problematic for corpora as large and varied as the Web. To make it possible for users to issue diverse queries over heterogeneous corpora, IE systems must move away from architectures that require relations to be specified prior to query time in favor of those that aim to discover all possible relations in the text.

In the past, IE has been used on small, homogeneous corpora such as newswire stories or seminar announcements. As a result, traditional IE systems are able to rely on "heavy" linguistic technologies tuned to the domain of interest, such as dependency parsers and Named-Entity Recognizers (NERs). These systems were not designed to scale relative to the size of the corpus or the number of relations extracted, as both parameters were fixed and small.

The problem of extracting information from the Web violates all of these assumptions. Corpora are massive and heterogeneous, the relations of interest are unanticipated, and their number can be large. These challenges are discussed below in greater detail.

The first step in automating IE was moving from knowledge-based IE systems to trainable systems that took as input hand-tagged instances or document segments and automatically learned domain-specific extraction patterns. Certain prior approaches, including Web-based question answering systems, have further reduced the manual labor needed for relation-specific text extraction by requiring only a small set of tagged seed instances or a few hand-crafted extraction patterns, per relation, to launch the training process. Still, the creation of suitable training data required substantial expertise as well as non-trivial manual effort for every relation extracted, and the relations have to be specified in advance.

Previous approaches to relation extraction have employed kernel-based methods, maximum-entropy models, graphical models, and co-occurrence statistics over small, domain-specific corpora and limited sets of relations. The use of NERs, as well as syntactic or dependency parsers, is a common thread that unifies most previous work. But this rather "heavy" linguistic technology runs into problems when applied to the heterogeneous text found on the Web. While the parsers of the prior approaches work well when trained and applied to a particular genre of text, such as financial news data in the Penn Treebank, they make many more parsing errors when confronted with the diversity of Web text. Moreover, the number and complexity of entity types on the Web means that existing NER systems are inapplicable.

Recent efforts by others who are seeking to undertake large-scale extraction indicate a growing interest in the problem. This year, a paradigm was proposed by other researchers, for "on-demand information extraction," which aims to eliminate customization involved with adapting IE systems to new topics. Using unsupervised learning methods, this earlier system automatically creates patterns and performs extraction based on a topic that has been specified by a user.

In addition, another research group described an approach to "unrestricted relation discovery," that was tested on a collection of 28,000 newswire articles. This early work contains the important idea of avoiding relation-specificity, but does not scale to the magnitude of the problem of extracting information from the entire Web, as explained below. Given a collection of documents, the prior system first performs clustering of the entire set of newswire articles, partitioning the corpus into sets of articles believed to discuss similar topics. Within each cluster, named-entity recognition, co-reference resolution, and deep linguistic parse structures are computed and are then used to automatically identify relations between sets of entities. This use of "heavy" linguistic machinery would be problematic if applied to the Web, since the time requirement for extracting information would be too great.

This earlier approach uses pair wise vector-space clustering and initially requires an $O(D^2)$ effort where D is the number of documents. Each document assigned to a cluster is then subject to linguistic processing, potentially resulting in another pass through the entire set of input documents. This approach is far more expensive for large document collections than would be desirable and would likely not be practical for extracting information from a corpus of text the size of the Web.

KNOWITALL is a previously developed Web extraction system that addresses the automation challenge by learning to label its own training examples using a small set of domain-independent extraction patterns. KNOWITALL also addresses corpus heterogeneity by relying on a part-of-speech tagger instead of a parser, and by not requiring an NER. However, KNOWITALL requires large numbers of search engine queries and Web page downloads to extract the desired information from a corpus such as the Web. As a result, experiments using KNOWITALL can take weeks to complete. Finally, KNOWITALL takes relation names as input. Thus, the extraction process has to be run, and re-run, each time a relation of interest is identified. Instead, it would thus be desirable to employ a novel paradigm that retains KNOWITALL's benefits, while substantially avoiding its inefficiencies.

SUMMARY

An exemplary method has been created for extracting relational information from a corpus of text without supervision or the use of predefined templates. Details of this method are described below. The method includes the step of automatically creating a classifier or other form of ranking model for classifying a quality of tuples that will be extracted from the corpus of text. Each tuple includes a plurality of objects and at least one relationship that connects the plurality of objects. Heuristics are automatically applied for extracting the tuples from the corpus of text, without human supervision or direction. Next, the classifier or ranking function that was created is employed to assess the quality of each of the tuples that were automatically extracted. The method then automatically determines which of the tuples will be retained, based upon the quality of each tuple that is returned by the classifier or ranking function.

When automatically applying heuristics to extract the tuples, the method identifies nouns and verbs in sentence-like text included in the corpus of text. Nouns that are identified prospectively comprise the objects included in tuples, and the verbs prospectively comprise relationships between the objects for tuples. The classifier can be applied by using a probability model to determine a probability that the relationship between objects in each tuple that has been extracted is trustworthy or not trustworthy. To determine which of the tuples will be retained, one approach provides for only retaining the tuples for which the relationship between the objects of the tuple has been determined to be trustworthy, so that the probability thus comprises an indication of the quality of the tuple.

In at least one embodiment, the classifier is created by using a parser to automatically identify objects and relationships of each tuple in training data. Each tuple in the training data is labeled as either trustworthy or not trustworthy in regard to a relationship between the plurality of objects comprising the tuple. The classifier learns how to classify tuples extracted from the corpus of text, in regard to their quality, in an unsupervised manner from the tuples that have been labeled as a training example. The classifier thus comprises an independent feature model classifier that is automatically trained without human interaction.

Another aspect of the novel approach that is discussed herein is directed to an exemplary system for automatically extracting relational information from a corpus of text without specifying criteria or patterns for controlling extraction of the relational information. The system includes a memory in which a plurality of machine instructions are stored, and a storage in which a corpus of text are stored. An interface is provided for coupling to the storage. A processor is coupled to the memory, and also to the storage through the interface. The processor executes the machine instructions stored in the memory to carry out a plurality of functions that are generally consistent with the steps of the method discussed above. Yet another aspect is directed to a memory medium on which machine executable instructions are stored. When executed by a processor, these machine executable instructions cause the processor to carry out functions that are also generally consistent with the steps of the method discussed above.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

Figure 2A:
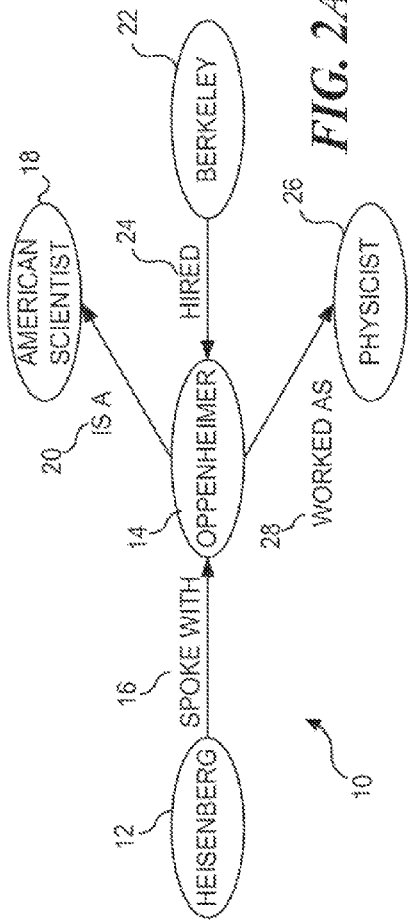
FIG. 2A illustrates an exemplary portion of an extraction graph (not all edges for these nodes are shown); an edge points from the first node or object in a tuple, toward a second node or object.
Figure 2B:
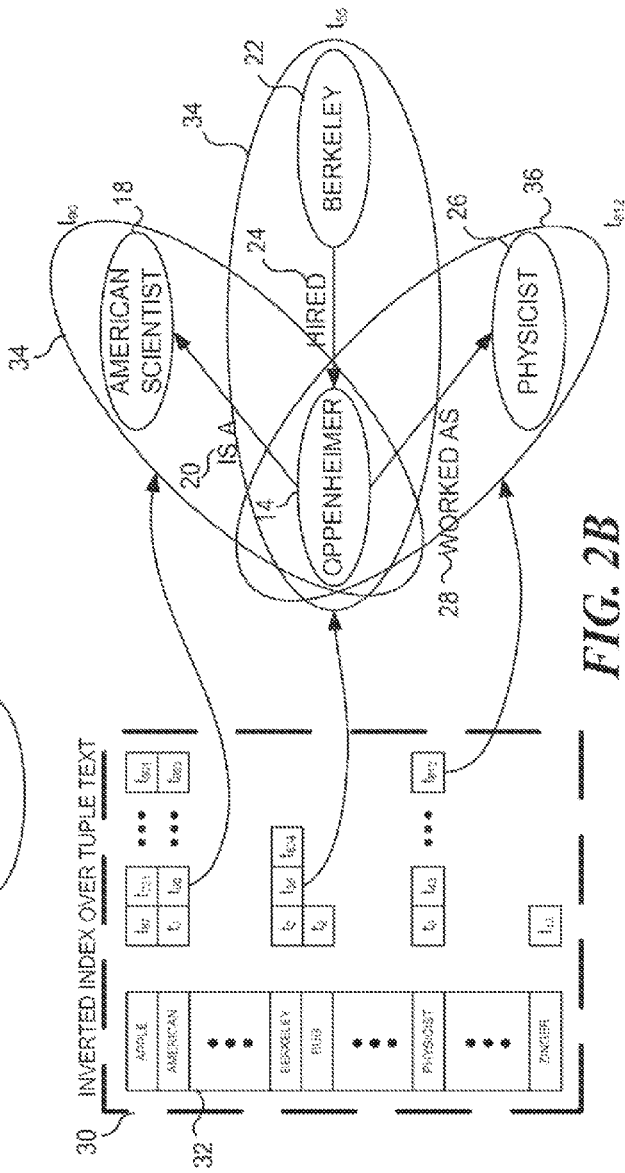
Figure 3:
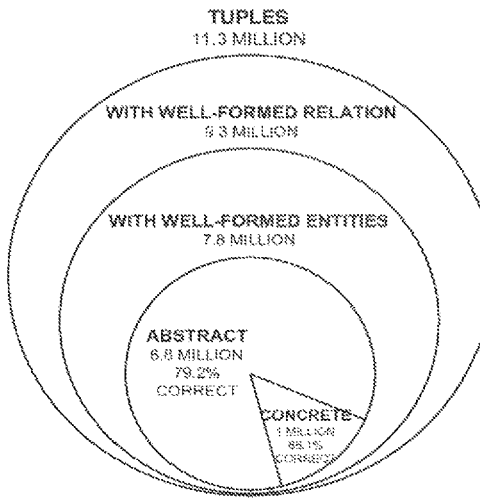
Figure 4:
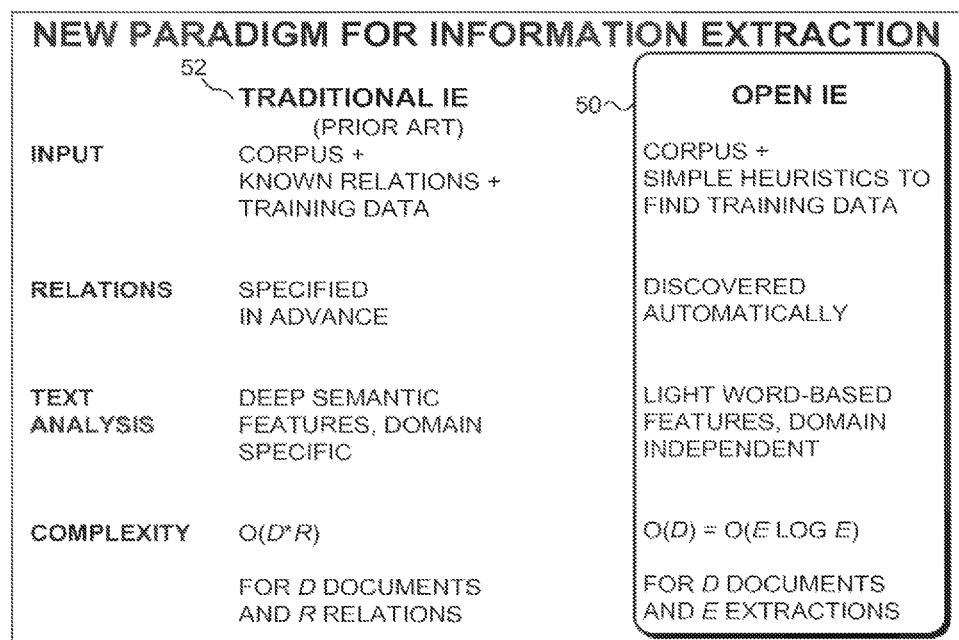
Figure 5:
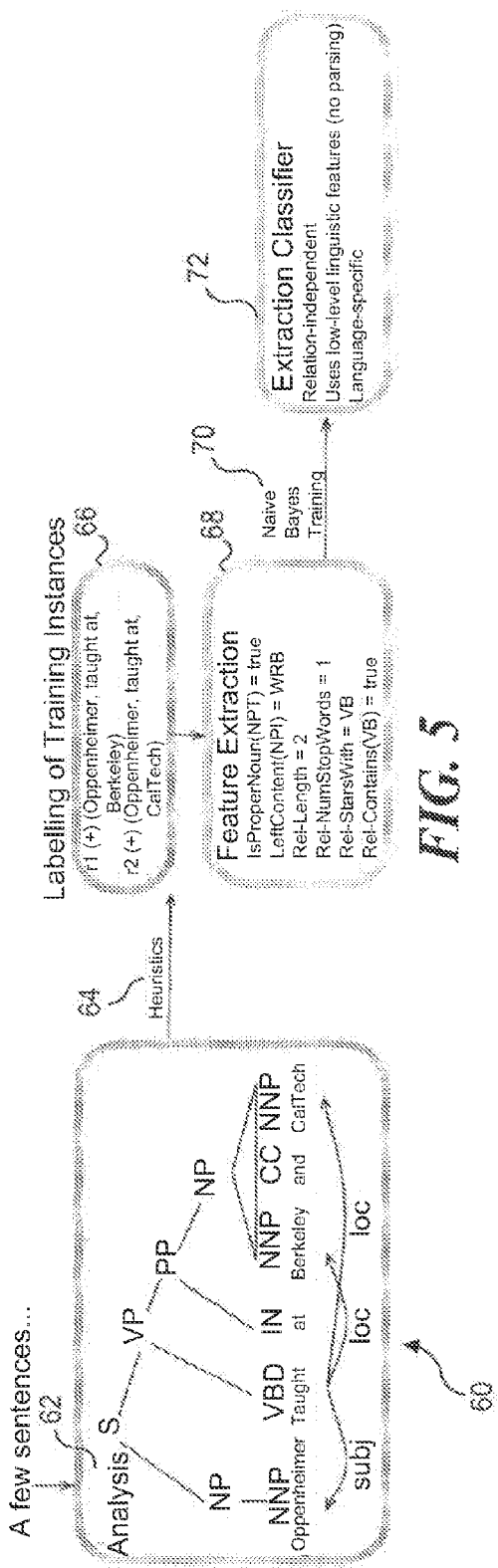
Figure 6:
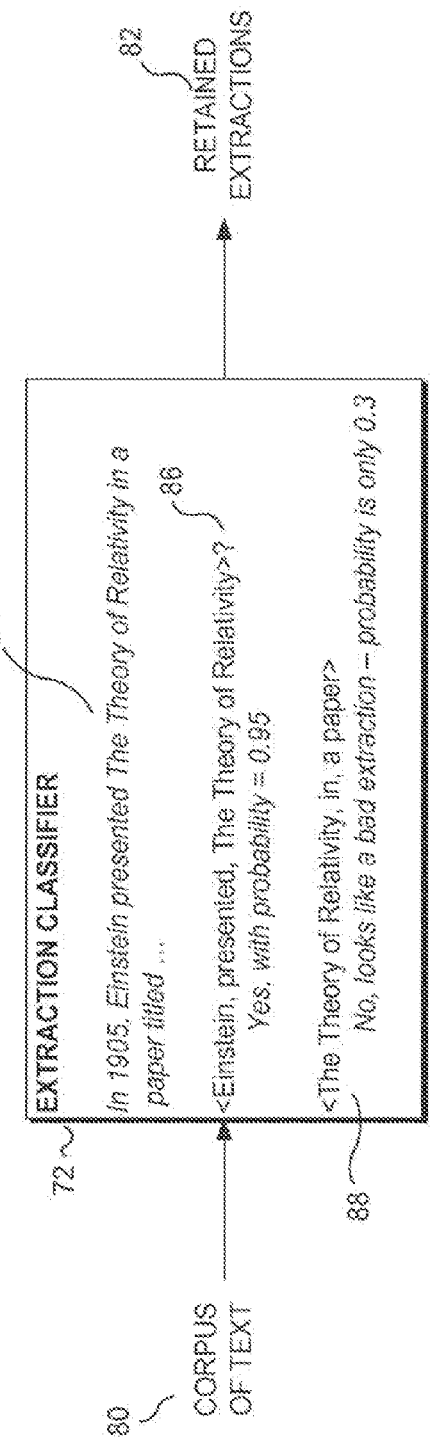
Figure 7:
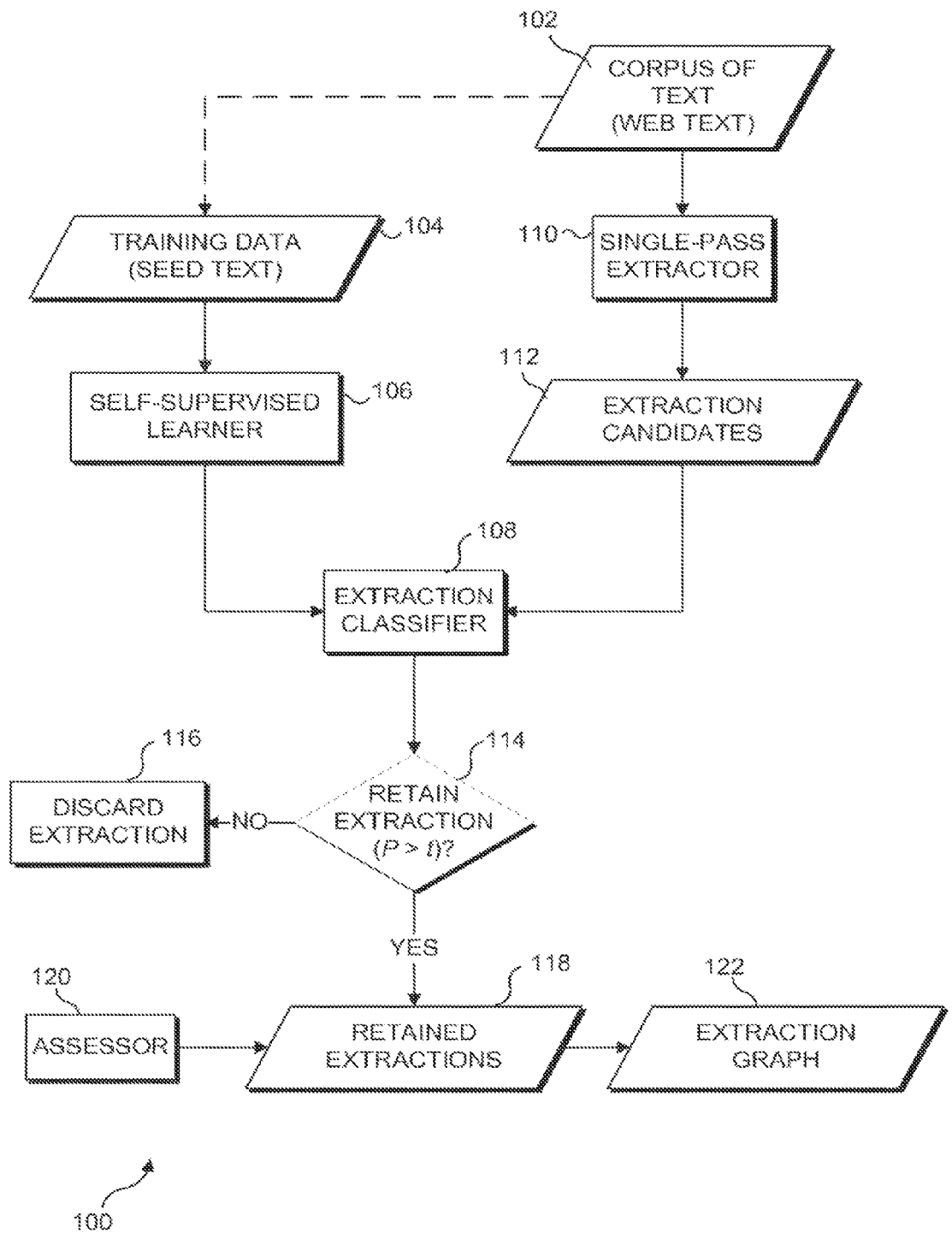
Figure 8:
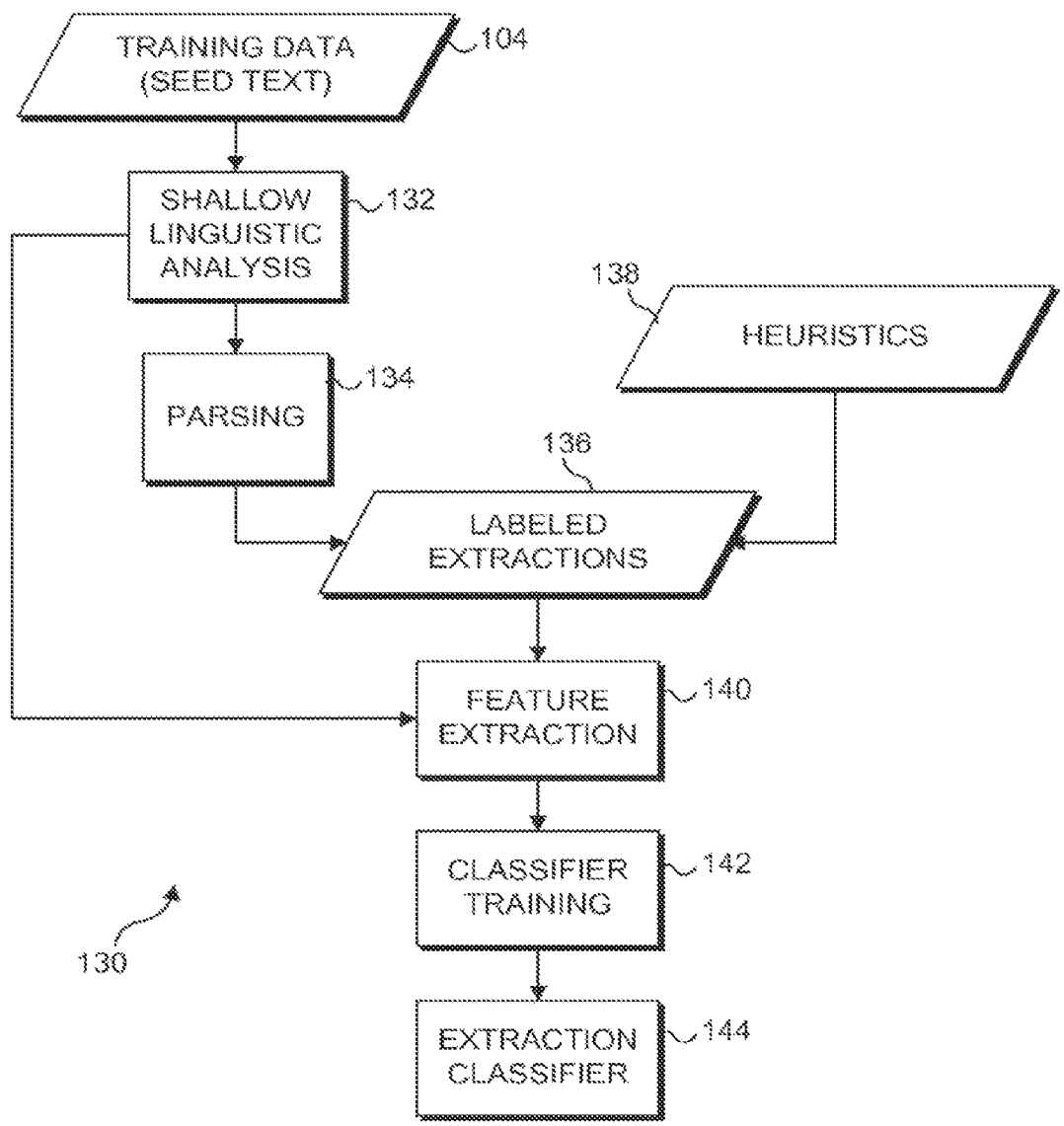
Figure 9:
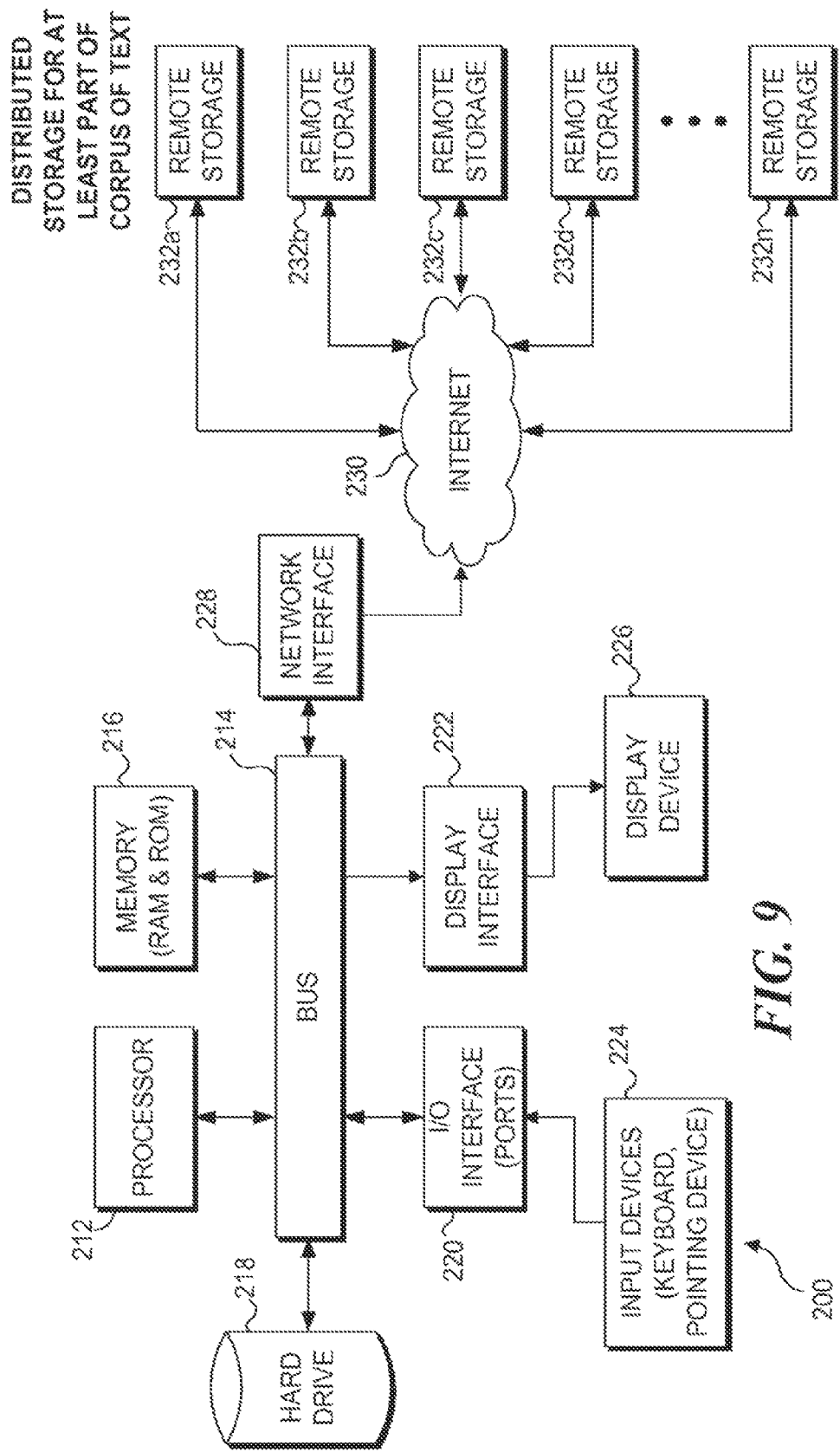

FIG. 2B graphically illustrates the use of an inverted index formed from an extraction graph for query processing, where the inverted index over the extraction graph text enables a spreading activation algorithm to instantly find all tuples that contain the search terms included in a query;

FIG. 3 is a graph providing an overview of the tuples extracted from a 9 million Web page corpus;

FIG. 4 is a chart comparing various characteristics of traditional (prior art) information extraction with the open information extraction provided by the present novel approach;

FIG. 5 is a chart illustrating the unsupervised learning technique that employs training data to develop an extraction classifier that can classify extracted information relationships as either trustworthy or untrustworthy;

FIG. 6 is functional diagram that illustrates how the extraction classifier is used for assessing the trustworthiness of two exemplary extracted tuples;

FIG. 7 is an exemplary flowchart illustrating the logical steps that are carried out in creating an extraction graph for a corpus of text (such as the Web);

FIG. 8 is an exemplary flowchart illustrating further details for the logical steps employed for creating an extraction classifier by unsupervised learning applied to training data, using shallow linguistic analysis, parsing, and heuristics; and FIG. 9 is a schematic block diagram of an exemplary generally conventional computing device that is suitable for use in the unsupervised extraction of information from a corpus of text, i.e., for carrying out the novel approach disclosed herein.

DESCRIPTION

Figures and Disclosed Embodiments are not Limiting

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein.

Exemplary Embodiment

TEXTRUNNER™

TEXTRUNNER is an exemplary fully implemented system that extracts relational tuples from text included in a corpus of text (such as the Web), in accord with the present approach. The tuples are assigned a probability and indexed to support efficient extraction and exploration via user queries.

The following discussion:
  Introduce Open Information Extraction (OIE)—a new extraction paradigm that obviates relation specificity by automatically discovering possible relations of interest while making only a single pass over its corpus.

Introduce TEXTRUNNER, a fully implemented OIE system, and highlight the key elements of its novel architecture. The following discussion compares TEXTRUNNER experimentally with the Web IE system, KNOWITALL, and show that TEXTRUNNER achieves a 33% relative error reduction for a comparable number of extractions.

Report on statistics over TEXTRUNNER's 11,000,000 highest probability extractions, which demonstrates its scalability, helps to assess the quality of its extractions, and suggests directions for future work.

Open IE in TEXTRUNNER

Figure 1:
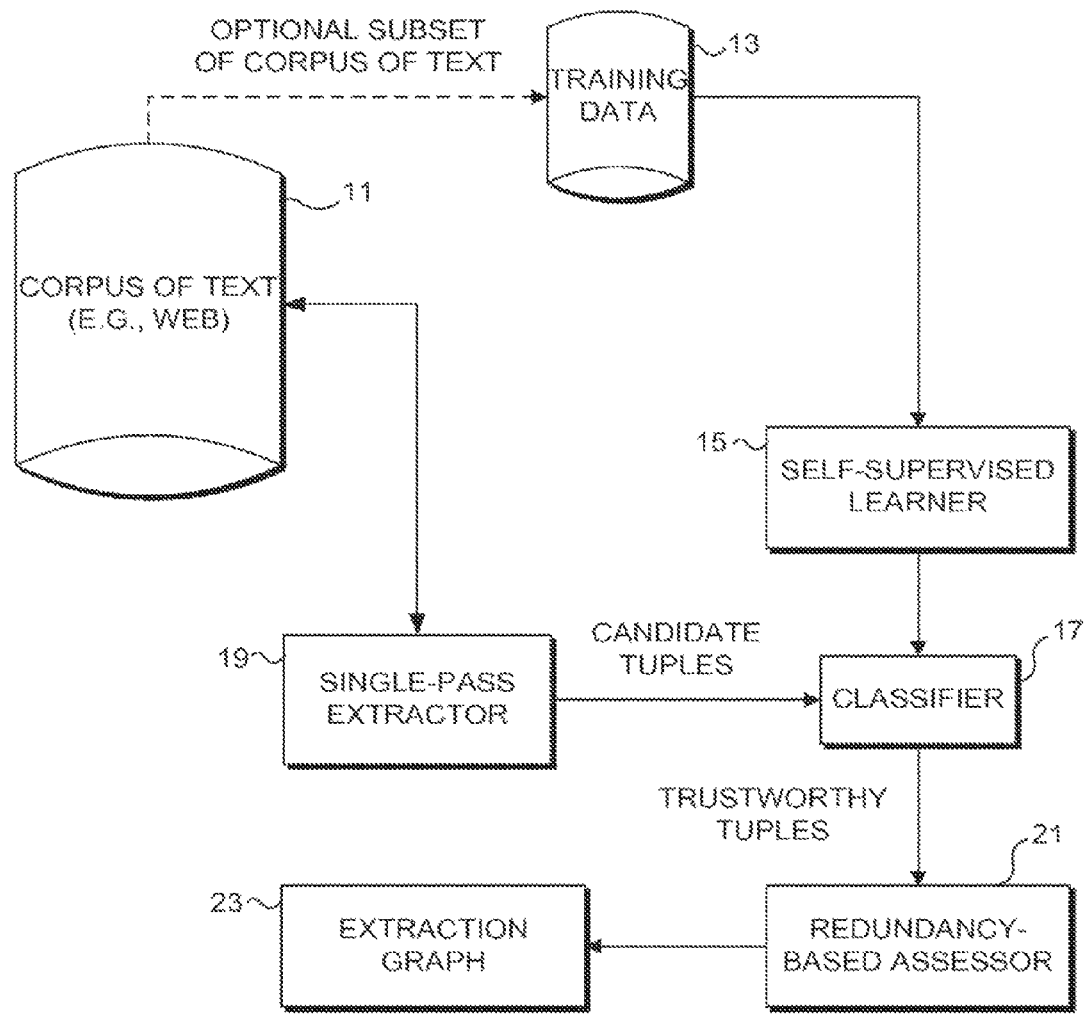
FIG. 1 is a block diagram illustrating the functional components of an exemplary embodiment of a system (referred to herein as "TEXTRUNNER™") for carrying out unsupervised extraction of relationships from a corpus of text.

The following describes TEXTRUNNER's architecture focusing on its novel components, which are shown in FIG. 1, and then considers how TEXTRUNNER addresses each of the challenges outlined above. Other than training data 13 that are used by a self-supervised learner 15, TEXTRUNNER's sole input is a corpus of text 11, and its output is a set of extractions, comprising an extraction graph 23 that are efficiently indexed, for example, to support exploration via user queries.

TEXTRUNNER includes three key modules:

1. Self-Supervised Learner (15): Given a small corpus sample as input, the Self-Supervised Learner produces a classifier 17 that is capable of labeling candidate tuples or extractions as "trustworthy" or not. The Self-Supervised Learner does not require hand-tagged data or predefined criteria to carry out this function. Other approaches besides a classifier can be used for ranking the tuples or relationships.
2. A Single-Pass Extractor (19): The Single-Pass Extractor makes a single pass over the entire corpus of text to extract candidate tuples for all possible relations. The Single-Pass Extractor does not utilize a parser. The Single-Pass Extractor generates one or more candidate tuples from each sentence in the corpus of text, sends each candidate tuple to classifier 17, and retains the tuples that are labeled as trustworthy.
3. A Redundancy-Based Assessor (21): Redundancy-Based Assessor 21 assigns a probability to each retained (trustworthy) tuple based on a probabilistic model of redundancy in the text (which is an approach previously used by others). Its output is extraction graph 23, which includes the retained tuples that were extracted, along with a probability value that was determined by the Redundancy-Based Assessor.

Each of these key modules is described below in greater detail. Also discussed is TEXTRUNNER's ability to efficiently process queries over its extraction set, and analyze the system's time complexity and speed.

Self-Supervised Learner

Self-Supervised Learner 15 operates in two steps. First, it automatically labels its own training data 13 as positive or negative, producing labeled data. Second, in this exemplary embodiment, it uses this labeled data to train a Naive Bayes classifier (i.e., to create classifier 17), which is then used by Single-Pass Extractor module 17. Other approaches can be used for ranking the data, to produce labeled data, and to learn how to rank the data.

While deploying a deep linguistic parser to extract relationships between objects is not practical at Web scale, it is hypothesized that a parser can help to train a classifier. Thus, as has been suggested by others, prior to full-scale relation extraction, the Learner uses a parser to automatically identify and label a set of trustworthy (and untrustworthy) extractions.

These extractions are used as positive (or negative) training examples to a Naive Bayes classifier. (Since this Learner labels its own training data, it is referred to as "self-supervised.") Use of a noise-tolerant learning algorithm helps the system recover from the errors made by the parser when applied to heterogeneous Web text.

Extractions take the form of a tuple $t=(e_i, r_{i,j}, e_j)$, where $e_i$ and $e_j$ are strings meant to denote entities or objects, and $r_{i,j}$ is a string meant to denote a relationship between the entities or objects.

The trainer of Self-Supervised Learner 15 parses several thousand sentences in training data 13 to obtain their dependency graph representations. For each parsed sentence, the system finds all base noun phrase constituents $e_i$. (In this exemplary embodiment, base noun phrases do not contain nested noun phrases, or optional phrase modifiers, such as prepositional phrases.) For each pair of noun phrases $(e_i, e_j)$, i<j, the Self-Supervised Learner traverses the parse structure connecting them to locate a sequence of words that becomes a potential relation $r_{i,j}$ in the tuple t. The Self-Supervised Learner labels t as a positive example if certain constraints on the syntactic structure shared by $e_i$ and $e_j$ are met. These constraints seek to extract relationships that are likely to be correct even when the parse tree contains some local errors; if any constraint fails, t is labeled as a negative instance. Some of the heuristics used by this exemplary embodiment are as follows:

There exists a dependency chain between $e_i$ and $e_j$ that is no longer than a certain length. For example, restricting the length of the dependency chain to no more than 4 was found to work well.

The path from $e_i$ to $e_j$ along the syntax tree does not cross a sentence-like boundary (e.g., relative clauses).

Neither $e_i$ nor $e_j$ consists solely of a pronoun.

Once the Self-Supervised Learner has found and labeled a set of tuples of the form $t=(e_i, r_{i,j}, e_j)$, it maps each such tuple to a feature vector representation. All features are domain independent, and can be evaluated at extraction time without the use of a parser. Examples of features include the presence of part-of-speech tag sequences in the relation $r_{i,j}$, the number of tokens in $r_i$, j, the number of stop words in $r_{i,j}$, whether an object e is found to be a proper noun, the part-of-speech tag to the left of $e_i$, and the part-of-speech tag to the right of $e_j$. Following feature extraction, the Self-Supervised Learner uses this set of automatically labeled feature vectors as input to a Naive Bayes classifier. As noted above, it is also contemplated that other approaches for carrying out the function of ranking data and for employing the training data to create such a ranking function or model.

Classifier 17, which is output by Self-Supervised Learner 15, is language-specific but contains no relation-specific or lexical features. Thus, it can be used in a domain-independent manner.

FIG. 5 graphically illustrates further details of a more specific example 60 that illustrates how Self-Supervised Learner 15 produces the classifier that will be used in processing a corpus of text. In this example, a few sentences are input to an analysis block 62, which parses the sentences to identify subject, verbs, prepositions, and objects, using a simple parser, as discussed above. As indicated, the parser extracts the relationship: "Oppenheimer taught at Berkeley and CalTech." Next, simple heuristics (indicated by reference number 64) are applied to label two training instances, as indicated in a block 66, specifically producing tuples t1 and t2, as follows: (t1) Oppeheimer, taught at, Berkeley; and (t2) Oppenheimer, taught at, CalTech. Feature extraction is then applied in a block 68 to identify specific characteristics of each of these tuples. Naive Bayes training (indicated by a reference number 70) is then used to produce an extraction classifier 72 that is relation independent, uses low-level linguistic features (no parsing is used), and is language specific.

FIG. 6 illustrates a simple example to show how extraction classifier 72 is used in connection with part of a sentence 84 that is included in a corpus of text 80. From this sentence, two possible relationships are extracted. A first relationship 86 is the tuple: Einstein, presented, The Theory of Relativity. The classifier determines that this tuple is trustworthy, since it indicates a relationship with a probability of about 0.95. A second relationship 88 is: The Theory of Relativity, in, a paper. The classifier correctly determines that this is an untrustworthy relationship, having a probability of only 0.3. So only the first relationship is included in retained extractions 82, as a result of processing by the extraction classifier 72. It must be emphasized that extraction classifier 72 is but one approach that is used in this exemplary embodiment for ranking the relationships that are identified, in terms of trustworthiness. This ranking or classifying function can be implemented in a myriad of different ways (e.g., by applying a probabilistic approach, a frequency-based approach, a heuristic approach, etc.). Thus, it is not intended that the ranking or classifying step discussed herein in anyway be limited to an extraction classifier.

Prior to using a learning approach like that disclosed above, several weeks were invested in manually constructing a relation-independent extraction classifier. A first attempt at relation extraction took the entire string between two entities detected to be of interest. Not surprisingly, this permissive approach captured an excess of extraneous and incoherent information. At the other extreme, a strict approach that simply looks for verbs in relation to a pair of nouns resulted in a loss of other links of importance, such as those that specify noun or attribute-centric properties, for example, (Oppenheimer, professor of theoretical physics) and (trade schools, similar to, colleges). A purely verb-centric method was prone to extracting incomplete relationships, for example, (Berkeley, located, Bay Area) instead of (Berkeley, located in, Bay Area). The heuristic-based approaches that were attempted exposed the difficulties involved in anticipating the form of a relation and its arguments in a general manner. At best, a final hand-built classifier, which is a natural baseline for the learned one (i.e., for classifier 17), achieved a mere one third of the accuracy of classifier 17, which was produced by the Self-Supervised Learner.

Single-Pass Extractor

Single-Pass Extractor 19 makes a single pass over corpus of text 11, automatically tagging each word in each sentence with its most probable part-of-speech. Using these tags, entities or objects are found by identifying noun phrases using a lightweight noun-phrase chunker. Relations are found by examining the text between the noun phrases and heuristically eliminating non-essential phrases, such as prepositional phrases that over specify an entity (e.g. "Scientists from many universities are studying . . . " is analyzed as "Scientists are studying . . . "), or individual tokens, such as adverbs (e.g., "definitely developed" is reduced to "developed").

For each noun phrase it finds, the chunker also provides the probability with which each word is believed to be part of the entity. These probabilities are subsequently used to discard tuples containing entities found with low levels of confidence. Finally, each candidate tuple t is presented to the classifier. If the classifier labels t as trustworthy, it is extracted and stored by TEXTRUNNER, for input to Redundancy-Based Assessor 21.

Redundancy-Based Assessor

During the extraction process, TEXTRUNNER creates a normalized form of the relation that omits non-essential modifiers to verbs and nouns, e.g. "was developed by" as a normalized form of "was originally developed by." After extraction has been performed over the entire corpus of text 11, TEXTRUNNER automatically merges tuples, in which both entities (or objects) and the normalized relation between the entities are identical and counts the number of distinct sentences (or sentence-like text) from which each extraction was found.

Following extraction, Redundancy-Based Assessor 21 uses these counts of distinct sentences to assign a probability to each tuple using a probabilistic model. Without hand-tagged data, the model efficiently estimates the probability that a tuple $t=(e_i, r_{i,j}, e_j)$ is a correct instance of the relation $r_{i,j}$ between $e_i$ and $e_j$ given that it was extracted from k different sentences (or sentence-like text). The model was shown to estimate far more accurate probabilities for IE than noisy- or and point-wise mutual information-based methods.

FIG. 2A illustrates several exemplary tuples 10 corresponding to a portion of an extraction graph produced by the present approach. In a first tuple, an entity 12 (Heisenberg) is coupled with an entity 14 (Oppenheimer) by a relationship 16 (spoke with). Entity 14 is also coupled to an entity 18 (American Scientist) by a relationship 20 (is a), with an entity 22 (Berkeley) by a relationship 24 (hired), and to an entity 26 (Physicist) by a relationship 28 (worked as).

Exemplary Logical Steps for Implementing Unsupervised Extraction of Relationships FIG. 7 is a flowchart 100 that illustrates exemplary logical steps for carrying out the process discussed above. The process starts by using training data 104, which may comprise a few thousand sentences of text and which may optionally be simply a subset of a much larger corpus of text 102. The corpus of text can be many millions of sentences or phrases of text (terabytes of data), and is contemplated, for example, to comprise all of the text included on the entire World Wide Web. Using the training data, a Self-Supervised Learner 106 creates an extraction classifier 108. Details of exemplary logical steps employed for creating the extraction classifier are explained below and are shown in FIG. 8.

Corpus of text 102 is accessed by a single-pass extractor 110, which determines extraction candidates 112, as discussed above. Each extraction candidate will include at least two entities or objects that are coupled by at least one relationship. The extraction candidates found in the corpus of text are then input to extraction classifier 108. The extraction classifier determines whether each extraction candidate or tuple is trustworthy or not, based upon a probability that the tuple correctly indicates a relationship between the one or more objects or entities comprising the tuple. A decision step 114 determines if each extraction is trustworthy and should be retained and included in retained extractions 118, or is untrustworthy and should be discarded as indicated in a step 116. This decision is based upon whether the probability, P, assigned to the candidate extraction or tuple is greater than some predefined limit, t. An assessor 120 (e.g., a Redundancy-Based Assessor) then assesses whether each tuple included in the retained extraction 118 should be included in an extraction graph 122, based upon the count of distinct sentences or phrases in which each retained extracted tuple was found. This assessment assigns a probability to each tuple using a probabilistic model, to estimate the probability that a tuple is a correct instance of the relationship indicated in the tuple, as a function of the number of distinct sentences (or sentence-like text) from which the tuple was extracted.

Query Processing

TEXTRUNNER is capable of responding to queries over millions of tuples at interactive speeds due to an inverted index distributed over a pool of machines. Each relation found during tuple extraction is assigned to a single machine in the pool. Every machine then computes an inverted index over the text of the locally-stored tuples, ensuring that each machine is guaranteed to store all of the tuples containing a reference to any relation assigned to that machine.

FIG. 2B illustrates a simple example that shows how an inverted index over tuple text 30 enables a spreading activation algorithm to efficiently find all tuples (or triples in this example) that include specified search terms. In this example, the objects or entities are listed in a column 32, next to the tuples in which those terms are included. An exemplary query includes the terms, "American," "Berkeley," and "Physicist," all of which have entries in the inverted index (as shown by the tuples illustrated to the left of the inverted index, which correspond to those in FIG. 2A). Retrieving graph regions that contain search terms enables spreading activation to quickly reach other nodes within the regions. In the illustrated example, the node "Oppenheimer" (i.e., entity 14) will score very highly since it receives activation from all three query terms, which correspond respectively to entities 18, 22, and 26 and respectively comprise tuples $t_{90}$, $t_{55}$, and $t_{812}$.

The efficient indexing of tuples in TEXTRUNNER means that when a user (or application) wants to access a subset of tuples by naming one or more of its elements, the relevant subset can be retrieved in a manner of seconds, and irrelevant extractions remain unrevealed to the user. Since the relation names in TEXTRUNNER are drawn directly from the text, the intuitions that they implicitly use in formulating a search query are effective. Querying relational triples will be easier once TEXTRUNNER is able to know which relations are synonymous with others. However, asking the user to "guess the right word" to use in a query is a problem that is shared by most search engines, which suggests that it is manageable for naive users.

Finally, TEXTRUNNER's relation-centric index enables complex relational queries that are not currently possible using a standard inverted index used by today's search engines. These include relationship queries, unnamed-item queries, and multiple-attribute queries, each of which is well known to those of ordinary skill in the art.

Analysis

Tuple extraction in TEXTRUNNER happens in $O(D)$ time, where D is the number of documents in the corpus. It subsequently takes $O(T \log T)$ time to sort, count, and assess the set of T tuples found by the system. In contrast, each time a traditional IE system is asked to find instances of a new set of relations R, it may be forced to examine a substantial fraction of the documents in the corpus, making system run-time equal to $O(R \cdot D)$. Thus, when D and R are large, as is typically the case on the Web, TEXTRUNNER's ability to extract information for all relations at once, without having them named explicitly in its input, results in a significant scalability advantage over previous IE systems (including KNOWITALL).

TEXTRUNNER extracts facts at an average speed of 0.036 CPU seconds per sentence. Compared to dependency parsers, which take an average of 3 seconds to process a single sentence, TEXTRUNNER runs more than 80 times faster on the corpus of text used when testing it. On average, a Web page in this corpus of text contains 18 sentences, making TEXTRUNNER's average processing speed per document equal to about 0.65 CPU seconds and the total CPU time to extract tuples from the 9 million Web page corpus of text less than 68 CPU hours. Because the corpus of text used in this test is easily divided into separate chunks, the total time for the process on a 20 machine cluster was less than 4 hours. It takes an additional 5 hours for TEXTRUNNER to merge and sort the extracted tuples. The performance of TEXTRUNNER relative to the prior art Web IE system, KNOWITNOW, is compared in FIG. 3.

The key to TEXTRUNNER's scalability is processing time that is linear in D (and constant in R). But, as the above measurements show, TEXTRUNNER is not only scalable in theory, but is also fast in practice.

Exemplary System for Implementing OIE of the Web

FIG. 9 illustrates an exemplary computing system 200 that is suitable for use as a computing device employed for implementing the novel approach described above, i.e., for carrying out the unsupervised extraction of information from at least a part of the corpus of text stored on the Web. It will be appreciated that a plurality of computing systems 200 will likely be employed for creating and maintaining an extraction graph for the Web, since a single such system (with the processing power/speed currently available), is too slow to achieve the desired speed and efficiency to carry out this task. Instead, it is likely that hundreds of such computing systems will share in this task, enabling the extraction process to be carried out and updated in an acceptable time.

Computing system 200 includes a processor 212 that is coupled in communication with a generally conventional data bus 214. Also coupled to the data bus is a memory 216 that includes both random access memory (RAM) and read only memory (ROM). Machine instructions are loaded into memory 216 from storage on a hard drive 218 or from other suitable non-volatile memory, such as an optical disk or other optical or magnetic media. These machine instructions, when executed by processor 212 can carry out a plurality of different functions employed to implement the approach as described herein, as well as other functions.

An input/output (I/O) interface 220 that includes a plurality of different types of ports, such as serial, parallel, universal serial bus, PS/2, and Firewire ports, is coupled to data bus 214 and is in turn connected to one or more input devices 224, such as a keyboard, mouse, or other pointing device, enabling a user to interact with the computing system and to provide input and control the operation of the computing system. A display interface 222 couples a display device 226 to the data bus, enabling a browser program window and other graphic and text information to be displayed for viewing by a user, if computing system 200 comprises a client computing device. The computing system is coupled to a network and/or to the Internet 230 (or other wide area network) via a network interface 228, which couples to data bus 214. Through the network interface, the computing system is able to access at least a portion of the corpus of text that is stored on distributed storage at remote storage sites 232a-232n, wherein the subscript "n" on "remote storage site 232n" can be a very large number, e.g., indicating that there are more than 100's of thousands of remote storage sites being accessed to extract information from the corpus of text stored at least in part at those sites.

Experimental Results

Recall and error rate of TEXTRUNNER were compared with that of a closed IE system on a set of relations, as listed below. The more fascinating challenge of characterizing the far broader set of facts and relations extracted by TEXTRUNNER is also discussed below.

Comparison with a Traditional IE System

One means of evaluating Open IE is to compare its performance with an existing state-of-the-art Web IE system. For this comparison, KNOWITALL, which is an unsupervised IE system capable of performing large-scale extraction from the Web, was used. To control the experiments, both TEXTRUNNER and KNOWITALL were tested on the task of extracting facts from a 9 million Web page corpus of text.

Since KNOWITALL is a closed IE system, it was necessary to select a set of relations in advance. (The term "closed IE system" refers to the requirement to specify the set of relations found by an IE system up front.) The following 10 relations that could be found in at least 1,000 sentences in the corpus of text used were randomly selected, while manually filtering out relations that were overly vague (e.g., relations with words such as "includes"):

```
(<proper noun>, acquired, <proper noun>)
(<proper noun>, graduated from, <proper noun>)
(<proper noun>, is author of, <proper noun>)
(<proper noun>, is based in, <proper noun>)
(<proper noun>, studied, <noun phrase>)
(<proper noun>, studied at, <proper noun>)
(<proper noun>, was developed by, <proper noun>)
(<proper noun>, was formed in, <year>)
(<proper noun>, was founded by, <proper noun>)
(<proper noun>, worked with, <proper noun>)
```

Table 1, which is included below, shows the average error rate over the ten relations and the total number of correct extractions for each of the two systems. TEXTRUNNER's average error rate is 33% lower than KNOWITALL's, but it finds an almost identical number of correct extractions. TEXTRUNNER's improvement over KNOWITALL can be largely attributed to its ability to better identify appropriate arguments to relations.

TABLE 1

|  | Average Error Rate | Correct Extractions |
| --- | --- | --- |
| TEXTRUNNER | 12% | 11,476 |
| KNOWITALL | 18% | 11,631 |

Still, a large proportion of the errors of both systems were from noun phrase analysis, where arguments were truncated or stray words added. It is difficult to find extraction boundaries accurately when the intended type of arguments such as company names, person names, or book titles are not specified to the system. This concern was particularly true for the "author of relation," where many arguments reflecting book titles were truncated and the error rate was 32% for TEXTRUNNER and 47% for KNOWITALL. With this outlier excluded, the average error rate is 10% for TEXTRUNNER and 16% for KNOWITALL.

Even when extracting information for only ten relations, TEXTRUNNER's efficiency advantage is apparent. Although they were run over the same 9 million page corpus, TEXTRUNNER's distributed extraction process took a total of 85 CPU hours to perform extraction for all relations in the corpus at once, whereas KNOWITALL, which analyzed all sentences in the corpus that potentially matched its rules, took an average of 6.3 CPU hours per relation. In the amount of time that KNOWITALL can extract data for 14 pre-specified relations, TEXTRUNNER discovers orders of magnitude more relations that are not pre-specified, from the same corpus.

Beyond the ten relations sampled, there is a fundamental difference between the two systems. Standard IE systems can only operate on relations given to them a priori by the user and are only practical for a relatively small number of relations. In contrast, Open IE operates without knowing the relations a priori and extracts information from all relations at once.

Global Statistics on Facts Learned

Given a corpus of 9 million Web pages, containing 133 million sentences, TEXTRUNNER automatically extracted a set of 60.5 million tuples at an extraction rate of 2.2 tuples per sentence.

When analyzing the output of open IE systems such as TEXTRUNNER, several questions naturally arise. How many of the tuples found represent actual relationships with plausible arguments? What subset of these tuples is correct? How many of these tuples are distinct, as opposed to identical or synonymous? Answering these questions is challenging due to both the size and diversity of the tuple set. As explained below, a series of estimates and approximations were made in order to address such questions.

As a first step, the analysis was restricted to the subset of tuples that TEXTRUNNER extracted with high probability. Specifically, the tuples that were evaluated met the following criteria: (1) TEXTRUNNER assigned a probability of at least 0.8 to the tuple; (2) the tuple's relation is supported by at least 10 distinct sentences in the corpus; (3) the tuple's relation is not found to be in the top 0.1% of relations by number of supporting sentences. (These relations were so general as to be nearly vacuous, such as (NP1, has, NP2).) This filtered set includes 11.3 million tuples containing 278,085 distinct relation strings and is the filtered set used in all the measurements described herein.

Estimating the Correctness of Facts

Four hundred tuples were randomly selected from the filtered set as a sample. The measurements below are extrapolated, based on hand tagging the sample. The tuples were then manually inspected in order to characterize the data extracted by TEXTRUNNER. Each evaluator first judged whether the relation was well-formed. A relation r is considered to be well-formed if there is some pair of entities X and Y such that (X, r, Y) is a relation between X and Y. For example, (FCI, specializes in, software development) contains a well-formed relation, but (demands, of securing, border) does not. If a tuple was found to possess a well-formed relation, it was then judged to see if the arguments were reasonable for the relation. X and Y are well-formed arguments for the relation r if X and Y are of a "type" of entity that can form a relation (X, r, Y). An example of a tuple whose arguments are not well-formed is (29, dropped, instruments).

The tuples that met these criteria were then further classified as either concrete or abstract. Concrete means that the truth of the tuple is grounded in particular entities, for example, (Tesla, invented, coil transformer). Abstract tuples are underspecified, such as (Einstein, derived, theory), or refer to entities specified elsewhere, but imply properties of general classes, such as (executive, hired by, company).

Finally, each concrete or abstract tuple was judged as true or false, based on whether it was consistent with the truth value of the sentence from which it was extracted. FIG. 3 summarizes this analysis of the extracted tuples. As indicated therein, about 11.3 million tuples were extracted from a limited corpus of text that included 9 million exemplary Web pages. Of these, about 9.3 tuples were found to have a well-formed relationship between the entities in the tuples, and about 7.8 million facts were found having both a well-formed relation and arguments (or entities) and a probability at least 0.8. Of those facts or tuples, 80.4% were deemed to be correct, according to human reviewers. Within a given relation, an average of 14% of the tuples (i.e., about 1 million) were deemed to be concrete facts, of which 88.1% are correct, and about 79.2% (or about 6.8 million tuples) were deemed to be abstract facts, of which about 77.2% were determined to be correct. Concrete facts are potentially useful for information extraction or question answering, while abstract assertions are useful for ontology learning and other applications. Of course, only a small subset of the universe of tuples would be of interest in any particular application (e.g., the tuples corresponding to the relations in the experiment described above).

Estimating the Number of Distinct Facts

Of the millions of tuples extracted by TEXTRUNNER, how many reflect distinct statements as opposed to reformulations of existing extractions? In order to answer this question, it is necessary to be able to detect when one relation is synonymous with another, as well as when an entity is referred to by multiple names. Both problems are very difficult in an unsupervised, domain-independent context, with a very large number of relations and entities of widely varying types. In these evaluative measurements, it was only possible to address relation synonymy, which means that the measurements reported below should be viewed as rough approximations.

In order to assess the number of distinct relations found by TEXTRUNNER, relations differing only in leading or trailing punctuation, auxiliary verbs, or in leading stopwords such as that, who, and which were further merged. For example, "are consistent with" is merged with, "which is consistent with." Also merged were relations differing only by their use of active and passive voice (e.g., invented is merged with was invented by). This procedure reduced the number of distinct relations to 91% of the number before merging.

Even after implementing the above-described merge, the question remains: how many of the relation strings are synonymous? This question is exceedingly difficult to answer because many of the relations that TEXTRUNNER finds have multiple senses. The relation developed, for example, may be a relation between a person and an invention but also between a person and a disease. It is rare to find two distinct relations that are truly synonymous in all senses of each phrase, unless domain-specific type checking is performed on one or both arguments. If the first argument is the name of a scientist, then developed is very likely to be synonymous with invented and created, and is closely related to patented. Without such argument type checking, these relations will pick out overlapping, but quite distinct sets of tuples. (Several preliminary experiments were carried out using a data-driven approach to synonym discovery based on a known approach for discovering inference rules from text that confirmed this hypothesis.)

It is, however, easier for a human to assess similarity at the tuple level, where context in the form of entities grounding the relationship is available. In order to estimate the number of similar facts extracted by TEXTRUNNER, the process began with the filtered set of 11.3 million tuples. For each tuple, clusters were found of concrete tuples, of the form:

$$(e_i, r, e_2), (e_i, q, e_2) \text{ where } r = 6q$$

that is, tuples where the entities match, but the relation strings are distinct. It was found that only one third of the tuples belonged to such "synonymy clusters."

Next, 100 synonymy clusters were randomly sampled and a manual process was carried out to determine how many distinct facts existed within each cluster. For example, the cluster of four tuples below describes two distinct relations R1 and R2 between Bletchley Park and Station X, as follows:

$R_1$ (Bletchley Park, was location of, Station X)
$R_2$ (Bletchley Park, being called, Station X)
$R_2$ (Bletchley Park, known as, Station X)
$R_2$ (Bletchley Park, codenamed, Station X)

Overall, it was found that roughly one quarter of the tuples in the sample were reformulations of other tuples contained somewhere in the filtered set of 11.3 million tuples. Given the previous measurement that two thirds of the concrete fact tuples do not belong to synonymy clusters, it can be computed that roughly 92% of the tuples found by TEXTRUNNER express distinct assertions. As pointed out earlier, this is an overestimate of the number of unique facts because the impact of multiple entity names is not factored into the result.

CONCLUSIONS

The preceding discussion discloses an exemplary approach to implement Open IE from the Web, using an unsupervised extraction paradigm that eschews relation-specific extraction in favor of a single extraction pass over the corpus of text, during which relations of interest are automatically discovered and efficiently stored. Unlike traditional IE systems that repeatedly incur the cost of analysis of the corpus of text with the naming of each new relation, the approach for implementing Open IE with a one-time relation discovery procedure enables a user to name and explore relationships at interactive speeds.

The preceding discussion also introduces TEXTRUNNER, an exemplary fully implemented Open IE system, and demonstrates its ability to extract massive amounts of high-quality information from a nine million Web page corpus of text. It has been shown that TEXTRUNNER is able to match the recall of the KNOWITALL state-of-the-art Web IE system, while achieving higher precision.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right as claimed is defined by the following:

1. A method in a computer system for automatically extracting relational information from a corpus of text, comprising:

generating a classifier to classify tuples as being trustworthy or not trustworthy by parsing sentences of a training corpus of text to identify training tuples, labeling the training tuples as trustworthy or not trustworthy based on whether the training tuples satisfy syntactic constraints as indicated by the parsing, extracting features of the training tuples, and training the classifier using the extracted features and the labels, a tuple including a first entity, a relationship, and a second entity;

conducting, by the computer system, a single pass through the corpus of text to automatically extract a plurality of tuples from the corpus of text using a set of linguistic features and classifying the extracted tuples as being trustworthy or not trustworthy by extracting features of the extracted tuples and applying the classifier to the extracted tuples.

2. The method of claim 1 wherein the providing the extracted tuples comprises generating an extraction graph based on the extracted tuples, wherein the extraction graph includes a plurality of entities from the corpus of text each entity connected to another entity by at least one word from the corpus of text describing the relationship between the connected entities.

3. The method of claim 1, further comprising:
  automatically ranking a quality of the extracted tuples that are classified as trustworthy; and
  automatically determining which of the extracted tuples will be retained, based upon the ranking of the quality of the extracted tuples.

4. The method of claim 3 wherein the automatically ranking comprises using a probability model to determine a probability that a relationship between entities in the extracted tuples is trustworthy.

5. The method of claim 1 wherein the entities include nouns.

6. A computer system having a processor and memory for automatically extracting relational information from a corpus of text, the computer system comprising:
  a classifier configured to classify tuples as being trustworthy or not trustworthy, the classifier generated by parsing sentences of a training corpus of text to identity training tuples, labeling the training tuples as trustworthy or not trustworthy based on whether the training tuples satisfy syntactic constraints as indicated by the parsing, extracting features of the training tuples, and training the classifier using the extracted features and the labels;
  an extractor configured to:
    conduct a single pass through the corpus of text to automatically extract a plurality of tuples from the corpus of text; and
    classify the extracted tuples as being trustworthy or trustworthy by extracting features of the tuples and applying the classifier to the extracted tuples,
  wherein the classifier and the extractor are implemented as computer-executable instructions stored in the memory and executed by the processor.

7. The system of claim 6 wherein the conducting of the single pass comprises generating an extraction graph based on the extracted tuples, wherein the extraction graph includes a plurality of entities from the corpus of text, each entity connected to another entity by at least one word from the corpus of text describing the relationship between the connected entities.

8. The system of claim 6, further comprising:
  a redundancy-based assessor configured to:
    assign a probability to at least a portion of the retained tuples, wherein the probability indicates a likelihood that an extracted tuple that is classified as being trustworthy is an actual instance of a relationship between the entities comprising the extracted tuple,
  wherein the redundancy-based assessor is implemented as computer-executable instructions stored in the memory and executed by the processor.

9. The system of claim 6 wherein the extractor is further configured to identify noun phrases from which at least a portion of the plurality of tuples are extracted.

10. A storage that is not a transitory, propagating signal from which instructions are loaded into memory, the storage having stored thereon computer-executable instructions for automatically extracting relational information from a corpus of text, the instructions comprising:
  instructions of a classifier for classifying tuples as being trustworthy or not trustworthy, the classifier generated by parsing sentences of a training corpus of text to identify training tuples, labeling the training tuples as trustworthy or not trustworthy based on whether the training tuples satisfy syntactic constraints as indicated by the parsing, extracting features of the training tuples, and training the classifier using the extracted features and the labels;
  instructions for automatically extract a plurality of tuples from the corpus of text using a set of linguistic features; and
  instructions for classifying the extracted tuples as being trustworthy or not trustworthy by extracting features of the tuples that do not require parsing of sentences and applying the classifier to the extracted tuples.

11. The storage of claim 10 wherein the instructions for providing the extracted tuples comprise instructions for generating an extraction graph based on the extracted tuples, wherein the extraction graph includes a plurality of entities from the corpus of text, each entity connected to another entity by at least one word from the corpus of text describing the relationship between the connected entities.

12. The storage of claim 10 wherein the instructions further comprise:
  instructions for determining the set of linguistic features, wherein the linguistic features are automatically determined by a computing device without manual intervention.

13. The storage of claim 10 wherein the instructions further comprise:
  instructions for automatically generating a ranking module configured to characterize relationships extracted from the corpus of text based on a quality of the relationships.

14. The storage of claim 10 wherein the instructions for using a set of linguistic features to automatically extract a plurality of tuples comprise instructions for:
  creating normalized relationships in the extracted tuples by omitting non-essential modifiers of verbs and nouns; and
  merging extracted tuples having at least substantially identical normalized relationships.

15. The method of claim 1, wherein conducting the single pass includes tagging at least a portion of words within the corpus of text with each tagged word's part of speech.

16. The method of claim 1, wherein the relationship is not specified prior to the extraction.

17. The method of claim 1, wherein the at least one word from the corpus of text includes a verb.

18. A method in a computer system for extracting relational information from a corpus of text, the relational information including tuples having a first entity, a relationship indicator, and a second entity, and the relationship indicator indicating a relationship between the first entity and the second entity, the method comprising:
  providing a classifier for determining whether the relationship indicator of a tuple indicates a correct relationship between the first entity and the second entity based on features of the tuple, the classifier being generated by parsing sentences of a training corpus of text to identify training tuples, labeling the training tuples as trustworthy or not trustworthy based on whether the training tuples satisfy syntactic constraints as indicated by the parsing, extracting features of the training tuples, and training the classifier using the extracted features and the labels;
  identifying syntactic information of words of the corpus;
  identifying a candidate tuple from the corpus based on the syntactic information of the words of the corpus, the relationship indicator of the candidate tuple including a word from the corpus describing the relationship between the first entity and the second entity;
  extracting features of the candidate tuple; and
  applying the classifier to the extracted features of the candidate tuple to determine whether the relationship indicator of the candidate tuple indicates a correct relationship between the first entity and the second entity of the candidate tuple.

19. The method of claim 18 wherein the syntactic information is a part-of-speech.

20. The method of claim 19 wherein the generating of the classifier includes:

identifying part-of-speech of words of a training corpus;

identifying training tuples from the training corpus based on the part-of-speech of the words of the training corpus;

identifying relationships between entities of the corpus by parsing sentences into parse structures and analyzing the parse structures to locate words that indicates relationships between entities;

assigning labels to the training tuples as to whether a relationship indicator of a training tuple indicates a correct relationship between a first entity and a second entity based on the relationships identified by the parsing and analyzing; and extracting features of the training tuples; and training the classifier using the labels and extracted features of the training tuples.

21. The method of claim 20 wherein the parser is a deep linguistic parser.

22. The method of claim 18 wherein the first entity, the relationship indicator, and the second entity of a tuple each includes a word extracted from the corpus.

23. The method of claim 18 wherein relationships are not predefined.

24. The method of claim 18 wherein the classifier generates a level of confidence that a relationship is correct.

25. The method of claim 18 wherein the classifier generates a probability that a relationship is correct.

* * * * *

UNITED STATES PATENT AND TRADEMARK OFFICE
CERTIFICATE OF CORRECTION

PATENT NO. : 8,938,410 B2  
APPLICATION NO. : 12/970155  
DATED : January 20, 2015  
INVENTOR(S) : Michael J. Cafarella et al.

Page 1 of 1

It is certified that error appears in the above-identified patent and that said Letters Patent is hereby corrected as shown below:

In the Specification

In column 6, line 3-4, delete ""self supervised.")" and insert -- "self-supervised.") --, therefor.

In column 6, line 65, delete "Oppeheimer," and insert -- Oppenheimer, --, therefor.

In column 8, line 19, delete "noisy- or" and insert -- noisy-or --, therefor.

In column 13, line 55, delete "(ei," and insert -- (e1, --, therefor.

In column 13, line 55, delete "(ei," and insert -- (e1, --, therefor.

In the Claims

In column 14, line 64, in claim 2, delete "text each" and insert -- text, each --, therefor.

In column 15, line 18, in claim 6, delete "identity" and insert -- identify --, therefor.

In column 15, line 29, in claim 6, delete "trustworthy" and insert -- not trustworthy --, therefor.

Signed and Sealed this  
Second Day of June, 2015

Michelle K. Lee  
*Director of the United States Patent and Trademark Office*